ELECTROLUMINESCENT DEVICES WITH OVERLOAD PROTECTION

Filed June 22, 1961

RICHARD P. DELACHAPELLE
HENRY T. HIDLER
INVENTORS

BY [signature]
ATTORNEY

United States Patent Office 3,109,958
Patented Nov. 5, 1963

3,109,958

ELECTROLUMINESCENT DEVICES WITH OVERLOAD PROTECTION

Richard P. Delachapelle, Gloucester, and Henry T. Hidler, Peabody, Mass., assignors to Sylvania Electric Products Inc., Salem, Mass., a corporation of Delaware Filed June 22, 1961, Ser. No. 125,333
5 Claims. (Cl. 315—74)

This invention relates to electroluminescent devices and particularly to those having means for limiting and transmitting current to an electrode in the device.

Most electroluminescent devices have two superposed electrodes, at least one of which is light transmitting, with a layer of an electroluminescent phosphor usually disposed in a light-transmitting dielectric material positioned between these electrodes. When a voltage, generally varying or alternating, is applied between the electrodes light is emitted from the phosphor and passed through the light-transmitting electrode. In most devices having commercial application, electrical contact is rather difficult to establish with the light-transmitting electrode, since that electrode is usually prepared of a thin, fragile layer of an electrical conducting material, such as tin oxide. Conventional means for establishing electrical contact, such as soldering or welding, are unsatisfactory for use with the light-transmitting electrode, since the attaching material will not adhere.

Prior means of establishing electrical contact have recognized these problems, but the conducting devices fabricated were rather large and bulky. Since one advantage of an electroluminescent device is that it may be formed in a compact, planar shape, electrical contact elements which protrude from the flat surface are often undesirable.

Accordingly, an object of our invention is the attainment of a compact electroluminescent device having an easily assembled, generally flat electrical contact.

An advantage of our invention is the reliable and positive nature of the electrical connection with the light-transmitting electrode of the device and a further advantage is that such contact is insured with a minimum of parts.

A feature of our invention is a printed circuit on a flexible insulator wherein the circuit is shaped to provide electrical contact areas connected by a means to limit current.

These and other objects, features and advantages will become apparent to those skilled in the art upon reading the following specification when taken in conjunction with the accompanying drawings in which.

In each of the figures of the drawing, similar numerical designations are indicative of similar elements.

Figure 1:
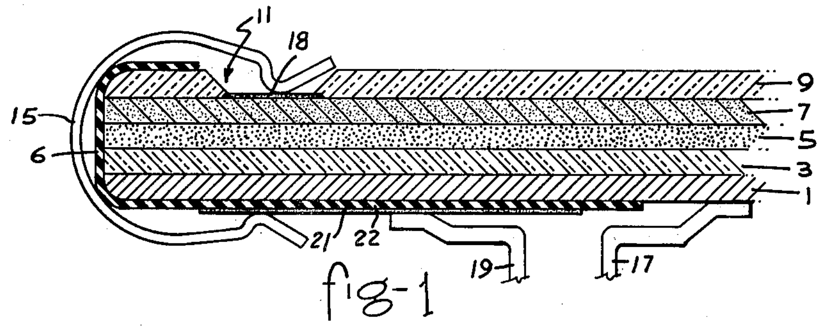
FIGURE 1 is a cross-sectional view of an electroluminescent device taken along the lines 1—1 of FIGURES 2 and 3. This figure shows in particular a printed circuit attached to an electroluminescent device by a U-shaped conducting clip and lead-in prongs biased against the printed circuit.

Referring to FIGURE 1, a cross section of an electroluminescent device is shown together with a means to conduct electricity to the light-transmitting electrode.

Base electrode 1 of the device is preferably prepared of a metal plate, since such materials impart stability, however, it is apparent that many other materials also have applicability. For example, the base electrode 1 may be prepared of a metal foil or of materials, such as plastic or glass which have been rendered electrically conductive. In these latter examples, the device has the added features that it may have two light emitting faces or may be flexible.

When desired, a ground coat 3 prepared of a layer of low-melting, ceramic dielectric material of known and suitable composition is coated over the base electrode 1, to provide a bonding surface for light-producing layer 5. It has been found that when using a metal plate for the base electrode 1, permanent adherence of a glass dielectric, light-producing layer 5 is rather difficult to establish, unless a ground coat is used. However, the ground coat may be omitted if the light-producing layer 5 readily adheres to the base electrode 1, such as would be the case if the electrode is electrically conductive glass or if the phosphor suspending dielectric is plastic.

Superposed on the ground coat 3 or on the base electrode 1, as desired, is a light-emitting layer 5 which is generally of an electroluminescent phosphor suspended in a light-transmitting dielectric material. The electroluminescent phosphor may be for example, a copper-activated zinc sulfide such as described in the co-pending application of Goldberg et al. entitled Electroluminescent Device, Serial No. 714,481, filed February 11, 1958, now Patent No. 3,050,655, issued August 21, 1962. The light-transmitting dielectric may be, for example, a glass frit such as described in the application of Richard M. Rulon, Serial No. 365,617, filed July 2, 1953; now abandoned, although suitable plastic dielectrics may also be used, such as described in the co-pending application of Sentementes et al., entitled Electroluminescent Devices and an Improved Dielectric Medium for Such Electroluminescent Devices, Serial No. 94,536, filed March 9, 1961.

Adhering to the light-emitting layer 5 is a coating which forms a light-transmitting electrode 7. This coating may be applied by spraying the light-emitting layer 5 with a solution of metal compounds, for example chlorides, oxides, sulfates or organic complexes of tin, antimony or indium; however, other available methods of applying an electrically conductive coating are for example, dipping and vapor deposition of metals. If the light-emitting layer 5 is hot when the solution of metal compounds is applied, a metal oxide of the metal compound will be formed; however, such metal oxides may also be formed by subsequently heating a light-emitting layer 5 which was coated while cold.

After the application of the light-transmitting electrode 7 on the face of the light-emitting layer 5, it is good practice to protect the various layers of the electroluminescent device from the effects of humidity and the possibility of scratching. Such protection is conveniently afforded by forming a glass or plastic protective layer 9 over the light-transmitting electrode 7. In a few cases, however, the protective layer 9 may be eliminated and the light-transmitting electrode 7 will then serve as the face of the electroluminescent device. Since protective layer 9 is an insulator and since electricity must be conducted to light-emitting electrode 7 to illuminate the device, a cavity 11 is provided in protective layer 9 to expose an electrical connection. Conveniently, the cavity 11 may be prepared by masking the light-transmitting electrode 7 before the protective layer 9 is applied. Thus, when the masking is removed the light-transmitting electrode 7 is exposed. Because of the fragility of the exposed light-transmitting electrode 7 and to inhibit the effect of humidity upon the phosphor, a small dab of finely divided metal dispersed in a resin, such as silver dispersed in epoxy, is placed in the cavity 11. After hardening, the metal will fill the bottom of cavity 11 and form a solid, electrically conducting, metallized surface on light transmitting electrode 7 for connection with a spring-type contact clip 15. The preferred method, however, of applying the metallized surface 18 is to spray a small area of the light-transmitting electrode 7 with a spraying suspension of firing silver and then applying the protective coating 9 over the entire electroluminescent device. Removal of a protective coating over the patch of firing silver will expose an electrical connection which is peripherally sealed from the atmosphere. We have found that low melting metals which do not readily oxidize, such as the noble metals, are most appropriate to be placed in the cavity 11, although other metals such as aluminum or copper may also be used.

For many applications of electroluminescence, such as room illumination, it is desirable to plug the device directly into conventional wall sockets. To this end, lead-in prongs 17 and 19 are provided in a holder (not shown). Lead-in prong 19 biases against a printed circuit which comprises a conductor 21 on an insulator 22, such as metallized plastic, for example copper or silver on Mylar or vinyl. The insulator 22 insulates the current carried by lead-in prong 19 from the base electrode 1. A side insulator 6 which is a prolongation of the insulator 22 is folded over the edge of the electroluminescent device to insulate conductive clamp 15 from the various layers. Conveniently, conductive clamp 15 not only conducts current, but also tightly holds the printed circuit against the electroluminescent device. Since one end of clip 15 is forced against printed conductor 21 and since the other end is in electrical communication with the light-transmitting electrode 9, electricity will be conducted from prong 19, through conductor 21 and conductive clip 15 to light-transmitting electrode 7. Although lead-in prongs which are spring biased against each of the base electrode 1 and conductor 21 are preferred to conduct electricity to the electrodes of the device, other means may also be used, such as spot welded or soldered lead-in wires.

The insulator 22 is disposed on the back electrode 1 and a prolongation 6 extends about the side of the electroluminescent device. The purpose of the insulator 22 is two-fold, to provide a base for an electrical conductor which conducts current to the light-transmitting electrode 7 and to insulate the conductor 21 from the back electrode 1 and the conductive clip 15 from the device. The flexible, flat surfaces of the insulator 22 are particularly desirable since an electroluminescent device may be prepared which has substantially no projections from the surfaces.

Figure 2:
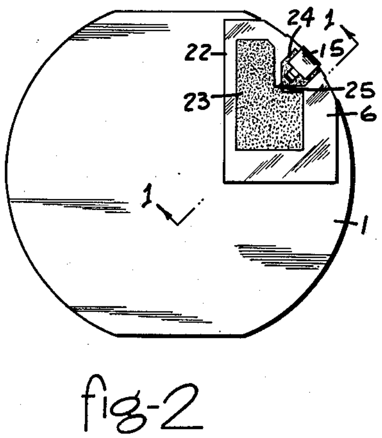
FIGURE 2 is a view of the rear of an electroluminescent device showing the device and a lead-in contact portion of the printed circuit.
Figure 3:
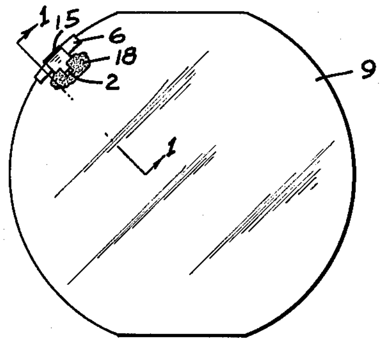
FIGURE 3 is a view of the light-emitting face of an electroluminescent device and shows the device and an electrical conducting clip associated with the light-transmitting electrode.

As shown in FIGURES 2 and 3, the conductor is divided into at least two contact portions spaced from each other and connected by current limiting means. Particularly, the conductor is divided into a lead-in contact portion 23, a clip contact portion 24 and interconnecting these portions is current limiting means 25, designed as a fuse or resistor. The lead-in contact portion 23 is conveniently provided with a relatively large surface area so that spring-biased lead-in prongs may establish efficient electrical contact or so that lead-in wires may be easily soldered or welded thereto. The peripheral shape of the lead-in contact portion 23 is not critical if the area is greater than the area of the lead-ins, however for convenience and compactness of design we prefer a rectangular shape having a recession in one corner thereof.

Inset within the recess of the lead-in contact portion 23 is a clip contact portion 24. Here, too, the peripheral shape and the size of the clip contact portion 24 is generally not important so long as sufficient area is provided to establish electrical contact with a conductive clip. However, the clip contact portion 24 is sufficiently spaced from the lead-in contact portion 23 so that these portions will be insulated from each other in all places, except for the interconnection provided by the current limiting means 25.

Such current limiting means 25 provide the only electrical connection between the clip contact portion 24 and the lead-in contact portion 23 and as desired, this interconnection may take the form of a fuse or a resistor. The possibility of short circuiting between electrodes in the electroluminescent device is materially minimized when a resistor is used to limit current in the circuit since power surges into the device are reduced. In many instances it is more desirable to have a fuse as the current limiting means, so that the fuse will break and no current will pass if the electroluminescent device short circuits.

The insulator 22 upon which the conducting surfaces are printed is conveniently formed in a generally rectangular shape with one corner thereof removed. Extending from the removed corner of the insulator 22 is a side insulator 6 which wraps around the side of the device and insulates contact clip 15 from the sides of the various layers. The side insulator 6 should be at least as long as the thickness of the electroluminescent device, however we prefer to make it a bit longer so that it will cover the small area of the light-transmitting face 9 of the device. In this manner, insulation of the contact clip from the various layers of the device is always insured.

Resilient, U-shaped conductive clip 15 rigidly attaches the printed circuit to the electroluminescent device and conducts current from the clip contact portion 24 to the metallized surface 18 and thence to the light-transmitting electrode. Each end of the contact clip 15 is provided with a small prolongation 2 which contacts each of the clip contact portion 24 and the metallized surface 18 of the light-transmitting electrode respectively. To avoid the possibility that the edges of either of these prolongations might scratch or gouge surfaces during attachment of the conductive clip 15 to the electroluminescent device, we prefer to place an indentation in the middle of each prolongation so that only rounded surfaces will serve as contacts. Since each leg of the U of the contact clip is of identical shape it may be easily attached to the electroluminescent device and no particular care need be taken concerning which side of the contact clip biases on which surface of the device. Conveniently, the conductive clip 15 is prepared of hard brass, phosphorous bronze or beryllium copper, although tempered steel and aluminum may also be used.

Figure 4:
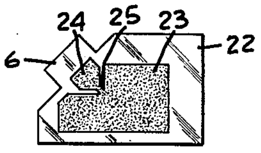
FIGURE 4 is a view of a printed circuit suitable for use in our electroluminescent assemblies.

FIGURE 4 illustrates the printed circuit before folding the prolongation 6 about the side of a device. When the current limiting means 25 is a fuse, the size and area thereof is quite important since these dimensions determine the characteristics of a circuit. In particular for a ten amp. fuse, operating on 110 volts we prefer to prepare the coating in thickness of less than 0.005 mil when the fuse is 0.012 to 0.015 inch wide. The length and width of the fuse may be varied however, to suit various circuits, for example in a 15 or 20 amp. circuit, thicker or wider fuses may be necessary. The insulator 22 must be sufficiently thick to withstand all possible heat generated during any melting of the fuse 25 upon the occasion of a possible short circuit and we have found for a ten amp. fuse that Mylar 0.005 inch thick may be used.

When the current limiting means 25 is a resistor, it is preferred to use a type of resistant ink which is generally prepared of either copper, silver or aluminum mixed together with graphite. These materials are then suspended in a lacquer dispersing medium. The size, shape, and quantity of these materials will determine the resistance of the resistor.

Although throughout the specification we have referred to the circuit as printed, it is to be realized that there are many methods of preparing the conductive coating, such as spraying, vapor deposition of metals and silk screening and we intend to include such modifications with the term "printed circuit."

It is apparent that changes and modifications may be made within the spirit and scope of the instant invention, but it is our intention however, to be limited only by the scope of the appended claims.

As our invention we claim:

1. In combination, an electroluminescent device having a base electrode, a superposed light-transmitting electrode and a light-emitting layer including an electroluminescent phosphor positioned between said electrodes; an insulator disposed on said base electrode; a printed circuit including a current limiting means supported on said insulator and insulated from said base electrode; means for electrically connecting said current limiting means to said light-transmitting electrode and for mechanically securing said insulator to said device, said means comprising a resilient U-shaped conductive clip positioned about the side of said device.

2. In combination, an electroluminescent device having a base electrode, a superposed light-transmitting electrode and a layer of light-emitting material including an electroluminescent phosphor positioned between said electrodes; an insulator disposed on said base electrode; a printed circuit including a current limiting means supported on said insulator and insulated from said base electrode; means to conduct electricity from said current limiting means to said light-transmitting electrode and for mechanically securing said insulator to said device which comprises a resilient U-shaped conductive clip positioned about the side of said device; means to insulate said conductive clip from said base electrode and said light-transmitting layer.

3. In combination, an electroluminescent device having a base electrode, a superposed light-transmitting electrode, and a layer of light-emitting material including an electroluminescent phosphor between said electrodes; an insulator disposed on said back electrode of said electroluminescent device; a printed circuit including a current limiting means supported on said insulator and insulated from said back electrode; means for electrically connecting said current limiting means to said light-transmitting electrode which comprises a U-shaped, resilient conductive clip positioned about the side of said device; means to insulate said contact clip from said base electrode and said light-emitting layers which comprises a prolongation of said insulator wrapped about the side of said device.

4. In combination, an electroluminescent device having a base electrode, a superposed light-transmitting electrode and a layer of light-emitting material including an electroluminescent phosphor between said electrodes; a metallized surface on said light-transmitting electrode; an insulator disposed on said base electrode; a printed circuit including a current limiting means supported on said insulator and insulated from said base electrode; means for electrically connecting said current limiting means to said metallized surface of said light-transmitting electrode which comprises a U-shaped resilient conductive clip positioned about the edge of said electroluminescent device; means for insulating said conductive clip from said base electrode and said light-emitting layer.

5. In combination, an electroluminescent device having a base electrode, a light transmitting electrode, a layer of electroluminescent phosphor disposed therebetween and a layer of protective glass fused to the face of said light-transmitting electrode; means forming an aperture in said protective glass to expose said light transmitting electrode; an electrically conductive, metalized surface disposed in said aperture and upon said transmitting electrode to shield said light transmitting electrode from abrasion; an insulator disposed beneath said base electrode and a prolongation extending from the side thereof disposed about the edge of said device; a printed circuit divided into two portions disposed upon said insulator and insulated from said back electrode, one portion of said printed circuit being adapted to be in electrical contact with a lead-in prong; current limiting means incorporated in said printed circuit and disposed between the two portions thereof; a U-shaped, resilient conductive clip disposed about the side of said device and over said insulator prolongation, one end of said conductive clip abutting against and being in electrical contact with said metalized surface and the other end abutting against and being in electrical contact with the other portion of said printed circuit; said conductive clip being adapted to attach said insulator to said device and carry current from said printed circuit to said metalized surface.

References Cited in the file of this patent

UNITED STATES PATENTS

| | | |
|---|---|---|
| 2,880,346 | Nicoll et al. | Mar. 31, 1956 |
| 2,908,806 | Cohen | Oct. 13, 1959 |
| 2,922,912 | Miller | Jan. 26, 1960 |